(12) United States Patent
Leonard

(10) Patent No.: US 7,506,881 B2
(45) Date of Patent: Mar. 24, 2009

(54) PROTECTIVE CURTAIN FOR VEHICLE SUSPENSION COMPONENTS

(75) Inventor: Joshua R. Leonard, Noblesville, IN (US)

(73) Assignee: BFS Diversified Products LLC, Indianapolis, IN (US)

(*) Notice: Subject to any disclaimer, the term of this patent is extended or adjusted under 35 U.S.C. 154(b) by 156 days.

(21) Appl. No.: 11/512,923

(22) Filed: Aug. 30, 2006

(65) Prior Publication Data

US 2008/0054584 A1 Mar. 6, 2008

(51) Int. Cl.
B60G 11/27 (2006.01)
F16F 9/04 (2006.01)

(52) U.S. Cl. ............... 280/124.1; 267/64.23; 267/64.24

(58) Field of Classification Search .......... 280/124.157, 280/124.1, 124.116, 727, 762, 847, 152.05, 280/124.135; 267/64.11, 64.19, 64.21, 64.23, 267/64.24, 64.27; 150/154, 157, 166
See application file for complete search history.

(56) References Cited

U.S. PATENT DOCUMENTS

| 2,902,103 | A | 9/1959 | Simmons |
| 4,722,516 | A | 2/1988 | Gregg |
| 4,741,517 | A | 5/1988 | Warmuth, II et al. |
| 5,129,634 | A | 7/1992 | Harris |
| 5,184,832 | A | 2/1993 | Miwa |
| 6,276,746 | B1 | 8/2001 | Gentry et al. |
| 6,460,646 | B2 | 10/2002 | Kanan |
| 6,726,273 | B2 | 4/2004 | Kruschhausen et al. |
| 6,845,973 | B2 | 1/2005 | Ferrer |
| 7,152,866 | B2 * | 12/2006 | Chalin et al. ............... 280/86.5 |
| 7,188,827 | B2 * | 3/2007 | Thomae et al. ......... 267/64.21 |
| 7,322,587 | B2 * | 1/2008 | Chalin et al. ............... 280/86.5 |
| 2003/0102612 | A1 * | 6/2003 | Branco et al. ............ 267/64.24 |
| 2004/0026836 | A1 | 2/2004 | Brookes |
| 2005/0151337 | A1 * | 7/2005 | Chalin et al. ............... 280/86.5 |
| 2005/0179177 | A1 * | 8/2005 | Thomae et al. ......... 267/64.27 |
| 2005/0253316 | A1 * | 11/2005 | Harms et al. ............. 267/64.27 |
| 2006/0208402 | A1 | 9/2006 | Keeney et al. |

FOREIGN PATENT DOCUMENTS

| DE | 1 816 597 | 8/1960 |
| EP | 1 596 093 | 11/2005 |
| JP | 2004 034871 | 2/2004 |

* cited by examiner

Primary Examiner—John Q. Nguyen
Assistant Examiner—Joseph Rocca
(74) Attorney, Agent, or Firm—Sarah M. Jabbari; Fay Sharpe LLP

(57) ABSTRACT

A protective curtain assembly for an associated fluid suspension system of an associated vehicle includes a section of curtain material and a first securement device securing the second of material along at least a portion of the associated suspension system. A suspension system including a protective curtain is also described.

17 Claims, 8 Drawing Sheets

PROTECTIVE CURTAIN FOR VEHICLE SUSPENSION COMPONENTS

BACKGROUND

The present novel concept broadly relates to the art of vehicle suspension systems and, more particularly, to a protective curtain for vehicle suspension components, such as an air spring assembly of a vehicle suspension system. The present novel concept finds particular application and use in conjunction with suspension systems of wheeled vehicles, and will be described herein with specific reference thereto. However, it is to be appreciated that the present novel concept is also amenable to use in other applications and environments, and that the specific uses shown and described herein are merely exemplary.

Air springs and other components are well known and commonly used elements of vehicle suspension systems. Additionally, devices of various types and kinds have been developed for use in operative association on or with such suspension components (e.g., air springs). Generally, though, the use of such devices has been found to be application specific, with a given device being used to meet a specific need or overcome an identified problem. As such, these devices are commonly employed to address specific conditions and/or issues associated with the vehicle suspension system or components thereof.

As an example, substantially rigid restraining devices, often referred to as restraining cylinders, are well known and commonly used to provide radial support to the flexible spring member of an air spring. Restraining devices are useful for permitting an air spring to be used at an increased air pressure level while maintaining the outer shape thereof within an established or desired dimension. Thus, added load capacity and/or performance can be achieved while maintaining a predetermined outer envelope.

An example of a restraining device can be found in U.S. Pat. No. 5,129,634 ('634) to Harris, which is entitled AIR-SPRING WITH PARTIAL RESTRAINING SLEEVE. The '634 patent discloses an air spring suspension with a restraining sleeve secured on an upper end member thereof. The restraining sleeve extends along the exterior of the flexible member of the air spring and circumferentially surrounds at least a portion of the same in a manner that may also provide some measure of protection thereto.

However, numerous disadvantages are associated with the use of restraining devices, which results in the same being poorly suited for use as protective or shielding devices. One such disadvantage is that restraining cylinders are commonly formed from a relatively stiff and often substantially rigid material. As such, clearance between the restraining cylinder and the surrounding structure is normally provided, which often leaves at least a portion of the air spring directly accessible and, thus, somewhat exposed. What's more, restraining cylinders are typically of a substantially shorter length than that of a fully extended air spring. As a result, at least a portion of the flexible spring member is often exposed and subject to damage, particularly during conditions in which the air spring is at least partially extended.

Another disadvantage of such restraining devices is that the same are normally seamless and of a cylindrical or other fully surrounding shape or construction. The restraining devices are typically mounted directly on a component of the air spring and extend fully around the periphery thereof. As a result, it is usually necessary to fully remove the suspension component to replace a damaged restraining cylinder.

Still another disadvantage of restraining cylinders is that the cylinder wall is in direct contact with the flexible spring member. As such, abrading of the spring wall and/or other undesirable conditions can occur due to the use of restraining cylinders. Additionally, the restraining device can contribute to heat retention within the air spring, which can result in degradation of the components thereof. Thus, it is beneficial to avoid using such constructions and/or devices where possible. For the foregoing and other reasons, it will be recognized that restraining devices or cylinders are poorly suited for use as shielding or protective devices.

Body skirts or covers are another example of components used on or in association with vehicles. Such devices are normally secured on the vehicle to protect or cover a portion, feature or component thereof. These devices can be generally classified as outer body covers or bottom covering devices depending on where on the vehicle they are located and to which parts thereof they are secured. Outer body covers, are typically secured along or across the vehicle body for aesthetic, aerodynamic or other purposes, such as along the front end of the vehicle or across the wheel wells thereof. Other covering devices are generally secured along the bottom of the vehicle to cover components there located, such as to minimize dripping of fluids therefrom, for example.

One example of such a device is shown in U.S. Pat. No. 6,460,646 ('646) to Kanan, which is entitled SNOWMOBILE SUSPENSION WELL SKIRT STRUCTURE. The '646 patent discloses a skirt structure or cover for a snowmobile suspension well. The skirt structure includes a sheet of fabric, such as vinyl, plastic, leather, cloth or canvas, for example, that preferably remains flexible at low temperatures. The skirt covers a portion of the suspension well to prevent snow from packing into the suspension well, which could undesirably reduce suspension travel and/or response and could also increase the front-end weight of the snowmobile. The skirt structure of the '646 patent also includes a rigid secondary ski that helps to minimize any packing of snow within the suspension well during operation in deep snow.

There are, however, disadvantages associated with the above-described skirts or body covers. For example, these devices often do not fully enclose the associated portion of the vehicle, which can result in undesirable exposure of the vehicle body or suspension components. Additionally, such arrangements are generally tautly secured on the snowmobile such that include windows or openings through which suspension components are passed are commonly provided. As such, these various gaps or openings can permit projectiles or debris to contact and potentially damage components covered by the skirt. Furthermore, known skirts and/or body covers are generally formed from relatively light-weight materials, as noted above. Such materials are poorly suited for stopping or deflecting high-velocity projectiles, such as shrapnel from explosive devices and/or firearm ordinances. Such skirts and other known body covers are generally not intended for such use, and typically do not extend across or cover sensitive components that might particularly benefit from such protection from high-velocity projectiles and debris.

Accordingly, there exists a need for a protective curtain that does not suffer from the above described problems and disadvantages.

BRIEF DESCRIPTION

A protective curtain assembly in accordance with the present novel concept for an associated fluid suspension system of an associated vehicle having a sprung mass and an unsprung mass is provided. The associated fluid suspension system is operatively disposed between the sprung and unsprung masses and includes a fluid spring assembly. The protective curtain assembly includes a section of curtain material having a first curtain portion and a second curtain portion. The section of curtain material extends along at least a portion of the associated fluid suspension assembly such that the first curtain portion is disposed toward the sprung mass and the second curtain portion is disposed toward the unsprung mass. A first securement device secures the first curtain portion of the section of curtain material along one of the sprung mass and the associated fluid suspension system. A second securement device secures the second curtain portion of the section of curtain material along one of the unsprung mass and the associated fluid suspension system.

A suspension system in accordance with the present novel concept for an associated vehicle that includes a sprung mass and an unsprung mass is provided that includes an operational portion supported between the sprung and unsprung masses, and that includes a fluid spring assembly. A protective portion includes a curtain disposed at least partially along the operational portion with at least a portion of the curtain being spaced outwardly from the fluid spring assembly.

A vehicle suspension system in accordance with the present novel concept for use on an associated vehicle having a sprung mass and an unsprung mass is provided that includes an air spring assembly operatively disposed between the sprung mass and the unsprung mass. The air spring assembly includes a first end member operatively connected with the sprung mass, a second end member in spaced relation to the first end member, and a flexible wall secured between the first and second end members. The air spring assembly is displaceable in an approximately axial direction between a compressed length and an extended length. A sheet of reinforced material extends along the air spring assembly between the sprung and unsprung masses and in outwardly spaced relation to the air spring assembly. The sheet of reinforced material includes a first sheet portion, a second sheet portion spaced from the first sheet portion, and an intermediate sheet portion having sufficient length to accommodate the air spring assembly displacement into the extended length.

DETAILED DESCRIPTION

Turning now to the drawings wherein the showings are for the purpose of illustrating exemplary embodiments of the present novel concept and not for the purpose of limiting the same, FIGS. 1-8 illustrate exemplary embodiments of suspension systems disposed between a sprung mass, such as an associated vehicle body BDY, for example, and an unsprung mass, such as an associated wheel WHL or an associated axle AXL, for example, of an associated vehicle VHC. The suspension systems include an operational portion and a protective portion. The operational portion acts to support the sprung mass on the unsprung mass and to provide typical suspension system functions. Generally, the protective portion is disposed along and around the operational portion and acts to shield or otherwise protect the operational portion and the components thereof from undesirable impacts, such as from debris, ordinance projectiles and/or shrapnel, for example.

Figure 1:
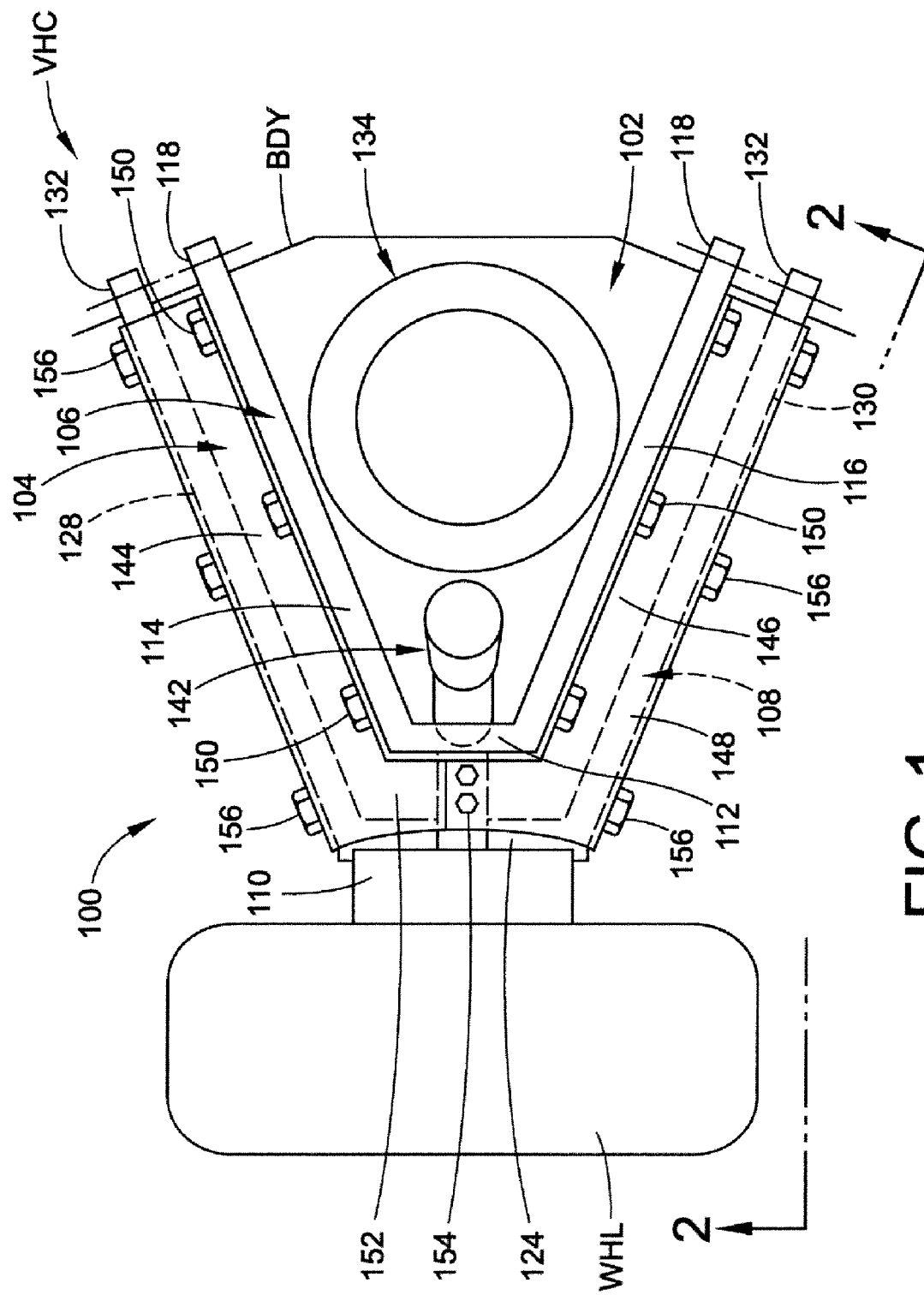
FIG. 1 is a top plan view of one exemplary embodiment of a protective curtain according to the present disclosure shown in use on an associated vehicle suspension system.
Figure 2:
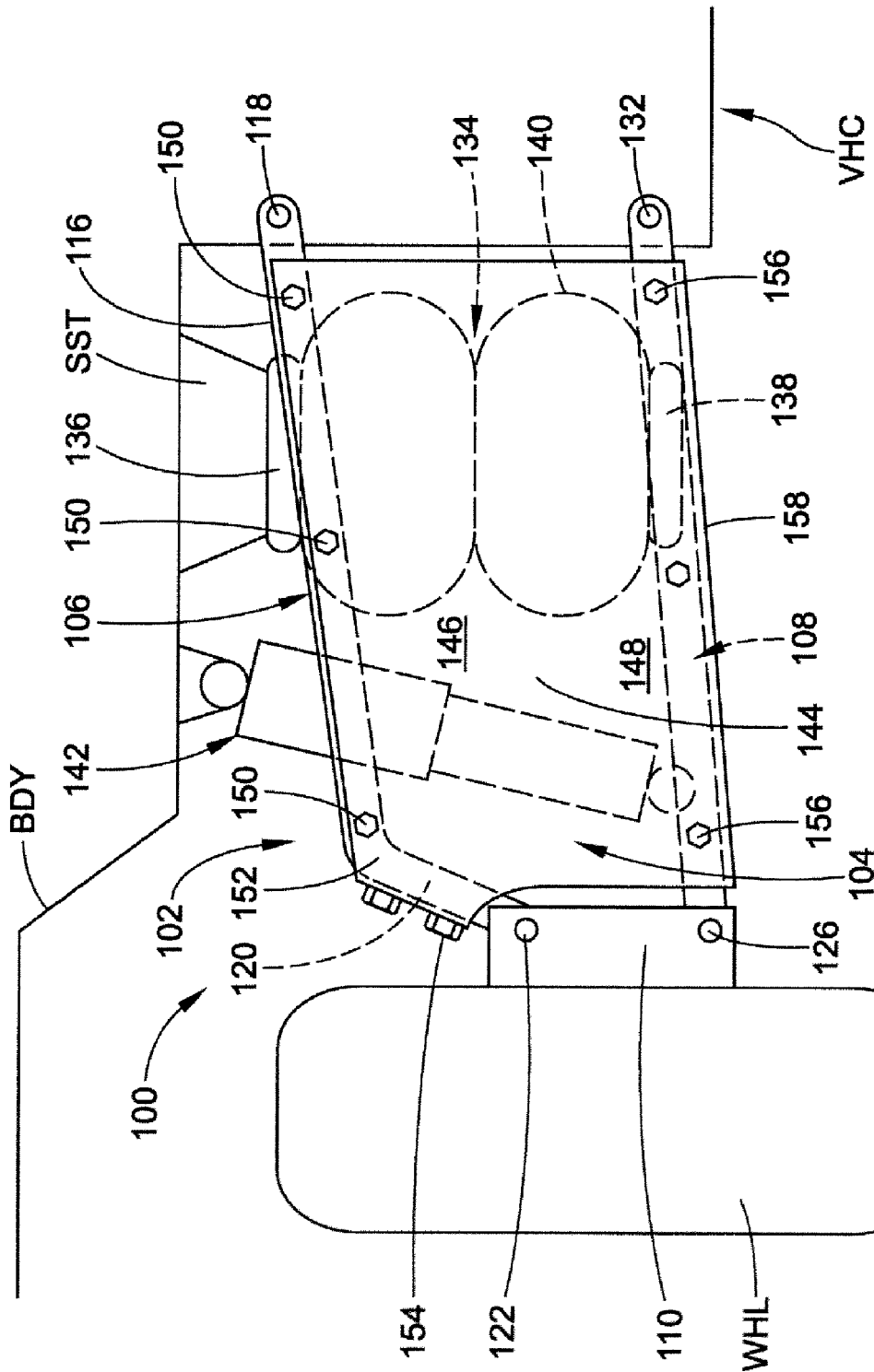
FIG. 2 is a side view of the protective curtain and associated vehicle suspension system in FIG. 1.

Turning more specifically to FIGS. 1 and 2, a suspension system 100 is disposed between a sprung mass, such as vehicle body BDY, for example, and an unsprung mass, such as wheel WHL, for example, of associated vehicle VHC. Suspension system 100 includes an operative portion 102 and a protective portion 104, as discussed above. In the exemplary embodiment shown, the operative portion includes a first or upper suspension member 106 and a second or lower suspension member 108 spaced from the first suspension member. The first and second suspension members are connected between vehicle body BDY and a wheel-engaging member, such as a hub 110, for example.

First or upper suspension member 106 and second or lower suspension member 108 can be of any suitable type, kind, configuration or arrangement. In the exemplary embodiment shown, first suspension member 106 includes a central portion 112 with outwardly extending first and second arm portions 114 and 116 that are operatively connected to the sprung mass, such as vehicle body BDY, for example, in a suitable manner, such as by using pivoting connections 118, for example. Additionally, a third arm portion 120 extends from central portion 112 and is operatively connected to a wheel-engaging member, such as hub 110, for example, such as by using a pivot connection 122, for example. Second suspension member 108 includes a central portion 124 pivotally supported along a wheel-engaging member, such as hub 110, for example, such as by using a pivoting connection 126, for example. Outwardly extending first and second arm portions 128 and 130 extend from central portion 124 and are operatively connected to the sprung mass, such as vehicle body BDY, for example, in a suitable manner, such as by using pivoting connections 132, for example.

Operational portion 102 of suspension system 100 also includes a fluid spring assembly, such as an air spring assembly 134, for example, operatively disposed between the sprung and unsprung masses. In the embodiment shown, air spring assembly 134 includes a first or upper end member 136, a second or lower end member 138 spaced from the first end member, and a flexible wall 140 secured between the first and second end members and at least partially forms a spring chamber (not shown) therebetween. First end member 136 is operatively connected along the sprung mass, such as to a spring seat SST disposed along body BDY, for example. Second end member 138 can be disposed on or along one of the first and second suspension members, and in the exemplary embodiment shown is supported on second suspension member 108 in a suitable manner. Optionally, the operational portion of suspension system 100 can also include a damper 142 secured between one of the first and second suspension members and the sprung mass.

Protective portion 104 of suspension system 100 includes a protective curtain 144 that is disposed along and around operational portion 102. Protective curtain 144 be of any suitable shape, form and/or configuration. For example, the protective curtain can be formed from two or more curtain panel that are secured on or along the different sections of the operational portion. Alternately, protective curtain 144 can be formed from a unitary sheet of curtain material or assembled into a single curtain member from a plurality of curtain panels, such as by stitching and/or using an adhesive, for example.

As shown in FIGS. 1 and 2, protective curtain 144 includes a first or upper curtain portion 146 and a second or lower curtain portion 148. First or upper curtain portion 146 is disposed along first or upper suspension member 106 and can be secured thereto in any suitable manner, such as by using removable fasteners 150, for example. First curtain portion 146 can also optionally include a front section 152 disposed along central portion 112. The front section can optionally be secured along the central portion in any suitable manner, such as being secured on third arm portion 120 using removable fasteners 154, for example. Second or lower curtain portion 148 extends along second or lower suspension member 108 and can be secured thereto in any suitable manner, such as by using removable fasteners 156, for example. Additionally, second curtain portion includes an optional bottom section 158 that extends along the bottom of second suspension member 108. Furthermore, optional support or clamping members (not shown) could also be included, such as by providing the same along portions of the protection curtain opposite the suspension or other structural members to which the protective curtain is secured. Such support or clamping members could then be secured on the suspension or other structural members along with the protective curtain in a suitable manner, such as by using fasteners 150, 154 and/or 156, for example.

Protective curtain 144 is shown in FIGS. 1 and 2 as being secured between upper and lower suspension members 106 and 108 without any visible loose curtain material. However, the protective curtain will preferably be formed from enough material such that the suspension system is permitted to move between a fully collapsed and a fully extended condition without interference from the protective curtain. Though, the protective curtain should not include enough material to permit the curtain to contact other components of the suspension system, particularly the flexible wall of a fluid spring assembly, which could result in abrasion or other undesirable characteristics.

Figure 3:
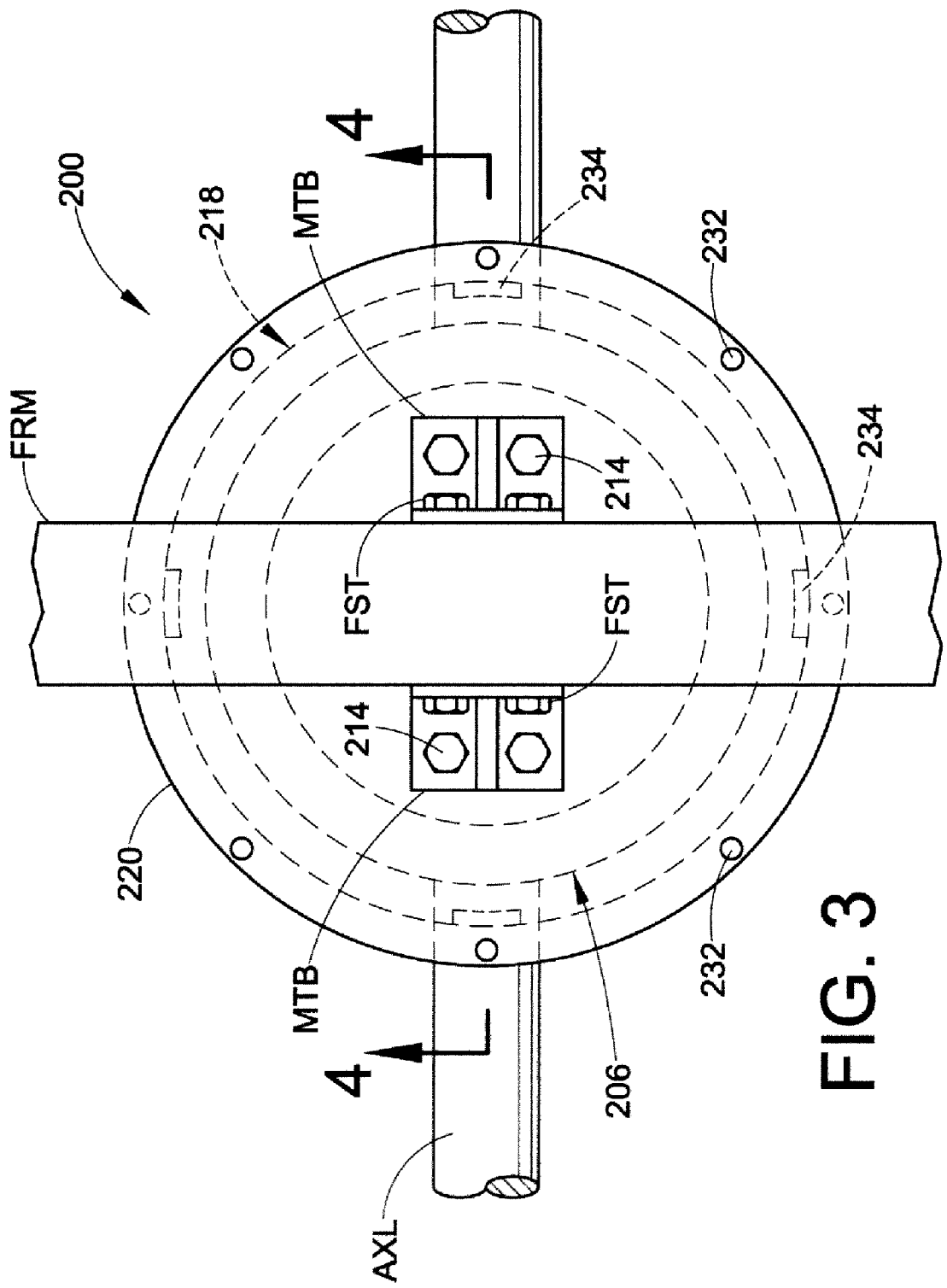
FIG. 3 is a top plan view of another exemplary embodiment of a protective curtain according to the present disclosure shown in use on an associated vehicle suspension system.
Figure 4:
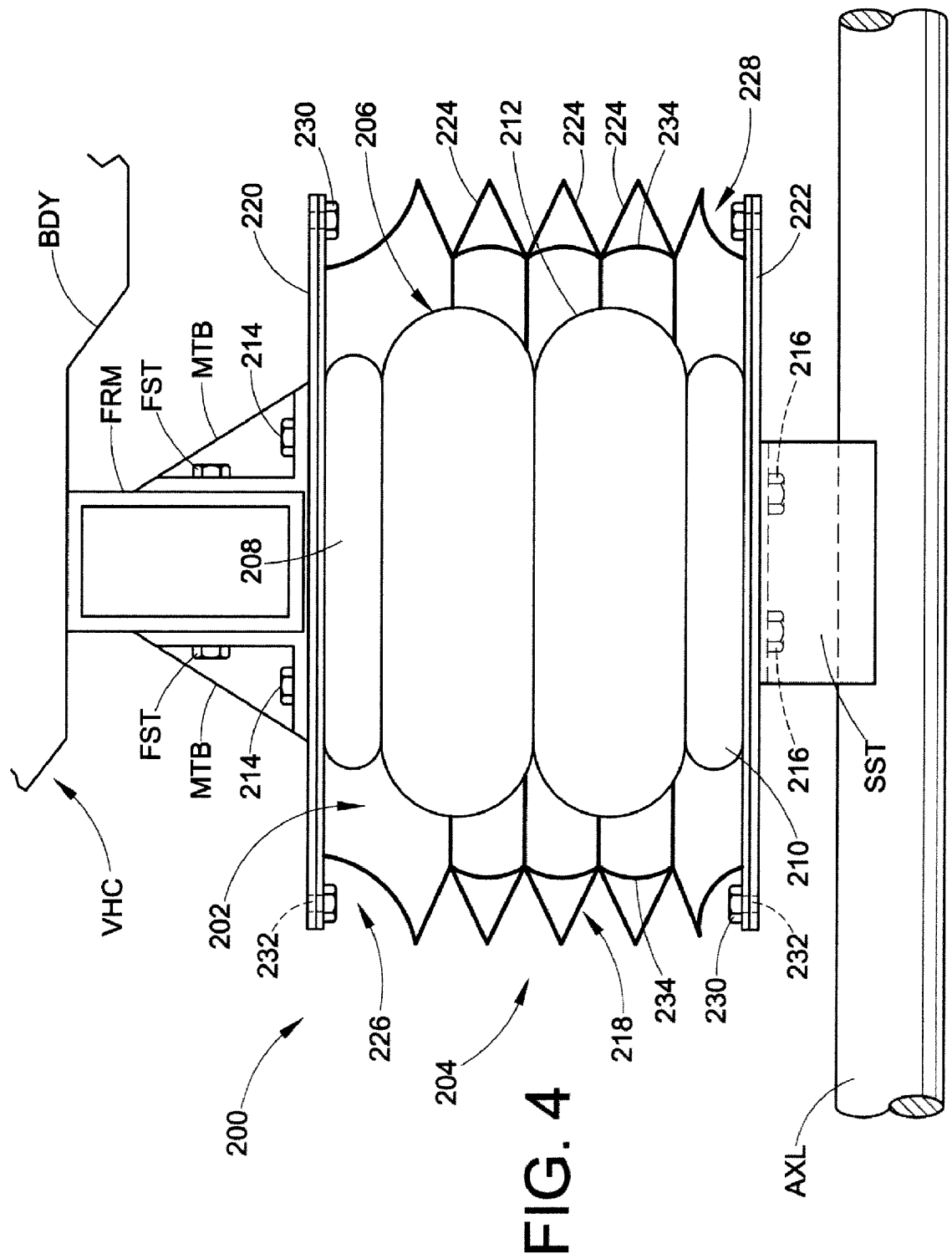
FIG. 4 is a side view of the protective curtain and associated vehicle suspension system in FIG. 3.

Another exemplary embodiment of a suspension system 200 is shown in FIGS. 3 and 4, and is disposed between a sprung mass, such as vehicle body BDY and/or frame member FRM, for example, and an unsprung mass, such as a wheel-engaging axle AXL, for example, of associated vehicle VHC. Suspension system 200 includes an operative portion 202 and a protective portion 204, as has been generally discussed above. In the exemplary embodiment shown, the operative portion includes a fluid spring assembly, such as an air spring assembly 206, for example, supported between an unsprung mass, such as axle AXL, for example, and a sprung mass, such as frame member FRM which supports vehicle body BDY, for example. Any suitable mounting arrangements can be used, such as an optional spring seat SST provided along axle AXL and/or one or more optional mounting brackets MTB provided along frame member FRM, for example. Suitable fasteners FST, such as threaded bolts, for example, can be used to secure mounting brackets MTB to frame FRM.

In the exemplary embodiment shown, air spring assembly 206 includes a first or upper end member 208, a second or lower end member 210 spaced from the first end member, and a flexible wall 212 secured therebetween and at least partially forming a spring chamber (not shown). Air spring assembly 206 is disposed between axle AXL and frame FRM such that first end member 208 is oriented toward the frame and second end member 210 is disposed toward the axle. In the embodiment in FIGS. 3 and 4, first end member 208 operatively engages frame FRM and can be secured therealong in any suitable manner, such as by using fasteners 214 extending between mounting brackets MTB and the first end member. Second end member 210 operatively engages optional spring seat SST and can be secured therealong in any suitable manner, such as by using fasteners 216 extending between the spring seat and the second end member, for example. Optionally, operative portion 202 can also include a damping member (not shown) of any suitable type, kind and/or configuration.

Protective portion 204 of suspension system 200 includes a protective curtain 218 disposed along and around at least a portion of operational portion 202. The protective curtain can be supported on the vehicle in any suitable manner, such as on or along a first or upper mounting component disposed toward first end member 208 and on or along a second or lower mounting component disposed toward second end member 210. In the exemplary embodiment shown in FIGS. 3 and 4, the first or upper mounting component includes a first mounting plate 220 supported along the sprung mass of the vehicle, such as between first end member 208 and frame FRM, for example. Additionally, the second or lower mounting component includes a second mounting plate 222 supported along the unsprung mass of the vehicle, such as between second end member 210 and spring seat SST, for example.

The first and second mounting plates can be secured respectively on or along the sprung and unsprung masses in any suitable manner, such as by capturing the first and second mounting components between the end members of the air spring assembly and the frame and spring seat, respectively. Fasteners 214 can thereby secure first mounting plate 220 and first end member 208 on or along frame FRM, and fasteners 216 can secure second mounting plate 222 and second end member 210 on or along spring seat SST.

Protective curtain 218 is shown in FIGS. 3 and 4 as including a plurality of bellows 224. However, it will be appreciated that protective curtain 218 can take any other suitable shape, form or configuration. Bellows or pleats 224 are secured together and permit the protective curtain to expand and collapse as the operational portion of the suspension system moves, such as between a collapsed condition and an extended condition, for example. Protective curtain 218 includes opposing ends 226 and 228 respectively secure on first and second mounting plates 220 and 222 in a suitable manner, such as by using suitable securement devices, such as fasteners 230, for example, extending through openings (not shown) in the bellows ends and engaging mounting holes 232 formed in the mounting plates, for example. Optionally, support or clamping members (not shown), such as approximately flat rings (not shown), for example, can be disposed along one of both of the bellows ends, such as opposite mounting plates 220 and 222, for example, and secured in a suitable manner, such as by using fasteners 230, for example, to compressively capture the bellows end. Additionally, to minimize the looseness and free movement of protective curtain 218, one or more biasing devices can optionally be provided on or along the protective curtain to at least partially reduce the looseness thereof, such as to minimize contact of the protective curtain with flexible wall 212 of air spring assembly 206, for example. One example of a suitable biasing device is shown in FIGS. 3 and 4 as lengths of material 234 secured between adjacent bellows 224. In the exemplary embodiment shown, a plurality of lengths of material 234 is spaced around the interior of protective curtain 218. It will be appreciated, however, that any other suitable arrangement could alternately or additionally be used.

Figure 5:
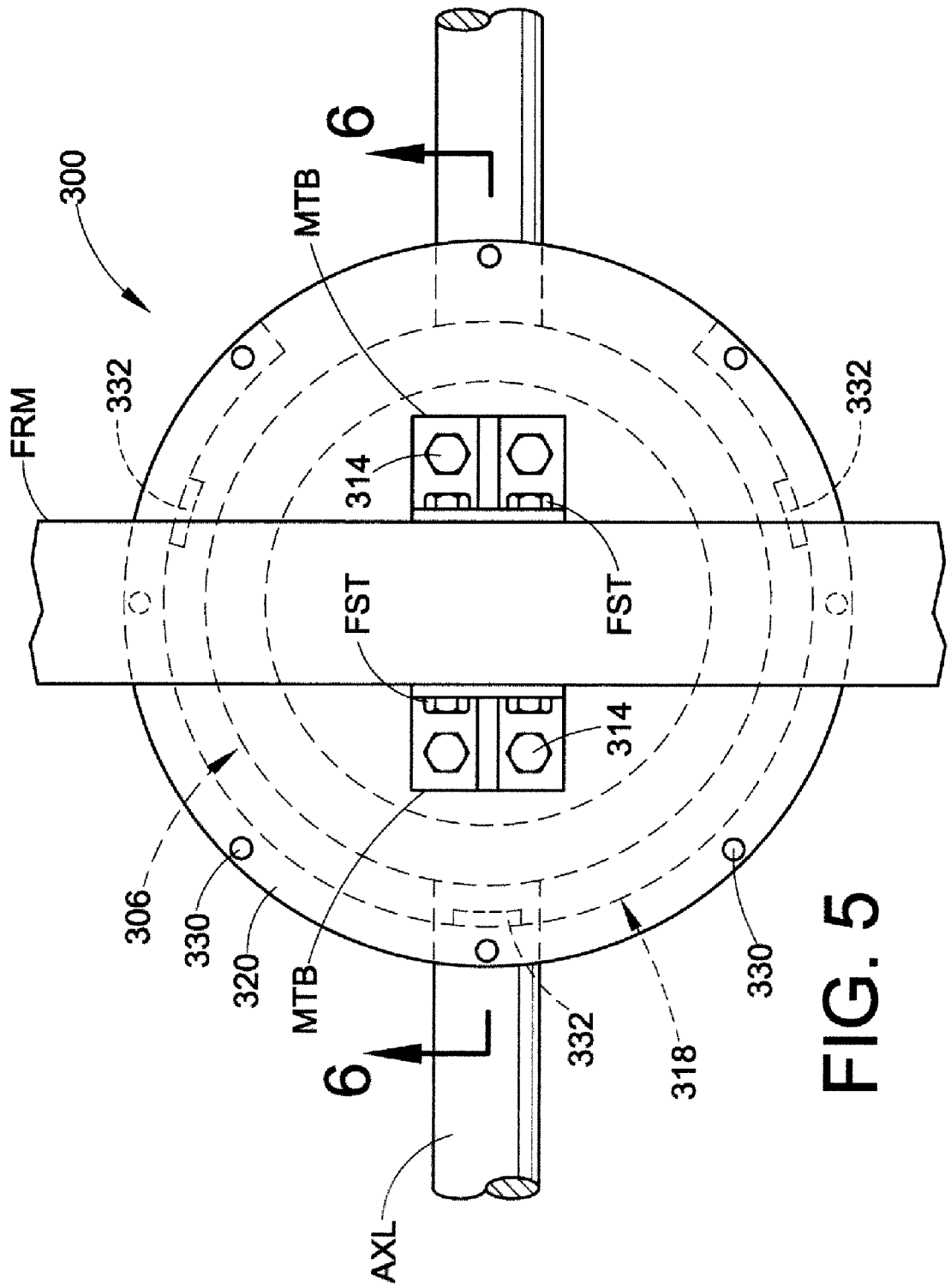
FIG. 5 is a top plan view of still another exemplary embodiment of a protective curtain according to the present disclosure shown in use on an associated vehicle suspension system.
Figure 6:
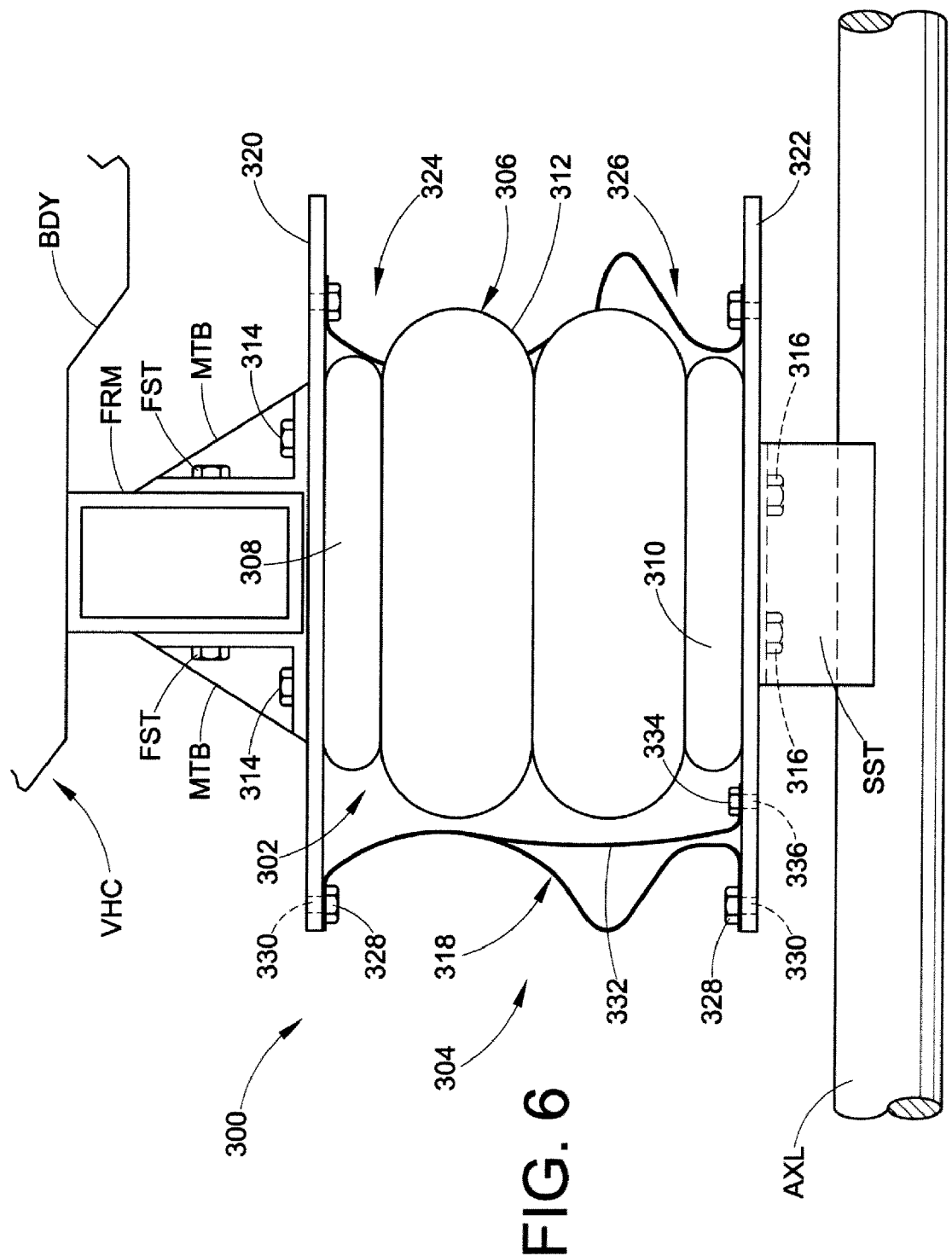
FIG. 6 is a side view of the protective curtain and associated vehicle suspension system in FIG. 5.

Another exemplary embodiment of a suspension system 300 is shown in FIGS. 5 and 6, and includes an operational portion 302 and a protective portion 304. It will be appreciated that operational portion 302 is shown as being substantially similar to operational portion 202 discussed above in detail with regard to FIGS. 3 and 4. Additionally, operational portion 302 is operatively associated with vehicle VHC in a substantially similar manner to that shown in and discussed with regard to FIGS. 3 and 4.

Operational portion 302 includes a fluid spring assembly, such as an air spring assembly 306, for example. Air spring assembly 306 includes a first or upper end member 308, a second or lower end member 310 spaced from the first end member, and a flexible wall 312 secured therebetween and at least partially forming a spring chamber (not shown). Air spring assembly 306 is disposed between axle AXL and frame FRM such that first end member 308 is oriented toward the frame and second end member 310 is disposed toward the axle. In the embodiment in FIGS. 5 and 6, first end member 308 operatively engages frame FRM and can be secured therealong in any suitable manner, such as by using fasteners 314 extending between mounting brackets MTB and the first end member. Second end member 310 operatively engages optional spring seat SST and can be secured therealong in any suitable manner, such as by using fasteners 316 extending between the spring seat and the second end member, for example. Optionally, operative portion 302 can also include a damping member (not shown) of any suitable type, kind and/or configuration.

Protective portion 304 of suspension system 300 includes a protective curtain 318 disposed along and around at least a portion of operational portion 302. The protective curtain can be supported on the vehicle in any suitable manner, such as on or along a first or upper mounting component disposed toward first end member 308 and on or along a second or lower mounting component disposed toward second end member 310. In the exemplary embodiment shown in FIGS. 5 and 6, the first or upper mounting component is a first mounting plate 320 supported along the sprung mass of the vehicle, such as between first end member 308 and frame FRM, for example. Additionally, the second or lower mounting component is a second mounting plate 322 supported along the unsprung mass of the vehicle, such as between second end member 310 and spring seat SST, for example.

The first and second mounting plates can be secured respectively on or along the sprung and unsprung masses in any suitable manner, such as by capturing the first and second mounting components between the end members of the air spring assembly and the frame and spring seat, respectively. Fasteners 314 can thereby secure first mounting plate 320 and first end member 308 on or along frame FRM, and fasteners 316 can secure second mounting plate 322 and second end member 310 on or along spring seat SST.

Protective curtain 318 can take any suitable shape, form or configuration, and includes opposing ends 324 and 326 respectively supported on or along first and second mounting plates 320 and 322 in a suitable manner, such as by using suitable securement devices, such as fasteners 328, for example, extending through openings (not shown) in the bellows ends and engaging mounting holes 330 formed in the mounting plates, for example. Optionally, support or clamping members (not shown), such as approximately flat rings (not shown), for example, can be disposed along one of both of the bellows ends, such as opposite mounting plates 320 and 322, for example, and secured in a suitable manner, such as by using fasteners 328, for example, to compressively capture the ends of the protective curtain.

For purposes such as minimizing looseness and free movement of protective curtain 318, one or more biasing devices can be provided on or along the protective curtain, such as to minimize contact of the protective curtain with flexible wall 312 of air spring assembly 306, for example. One example of suitable biasing devices is shown in FIGS. 5 and 6 as lengths of material 332 having opposing ends, with one end secured along the protective curtain and the other end secured on another feature or component, such as one of the first and second mounting plates, for example. In the exemplary embodiment shown, a plurality of lengths of material 332 are spaced around the interior of protective curtain 318 and one end thereof is secured to the protective curtain in a suitable manner, such as by stitching and/or using adhesive, for example. The other end of lengths of material 332 are secured on second mounting plate 322 in a suitable manner, such as by using a securement device, such as a fastener 334 engaging a mounting hole 336 in the second mounting plate, for example. It will be appreciated, however, that any other suitable arrangement could alternately or additionally be used. It will be appreciated that biasing devices, such as lengths of material 234 and/or 332, for example, can be formed from any suitable material or combination of materials, such as metal, plastic, rubber, fabric or any other suitable material in any suitable form.

Protective portion 304 differs from protective portion 202 in that protective curtain 218 includes a plurality of bellows or pleats 224, whereas protective curtain 318 does not include such features. As such, it will be recognized that the inclusion of such bellows or pleats is optional. Additionally, FIGS. 3 and 4 illustrate protective curtain 218 as extending substantially entirely around at least a portion of operational portion 202, such as air spring assembly 206 thereof, for example. However, protective curtain 318 of protective portion 304 is shown extending along or around only a portion of air spring assembly 306 of operational portion 302. As such, an opening 338 is provided in protective portion 304. Such an opening is preferably disposed toward a structural portion of the vehicle, such as a wall of vehicle body BDY, for example, to minimize exposure of the operational portion of the suspension system that is shielded or otherwise protected by protective portion 304. However, it will be recognized that in some applications it will be beneficial to have at least a small opening in the protective curtain, such as to permit frequent inspections of the air spring assembly without substantial disassembly of the protective portion or to minimize retention of heat, dust, dirt or water, or for other reasons.

It will be appreciated that depending upon the materials, construction and arrangement of a given protective portion as well as the anticipated operating environment and conditions of use therefor, the protective curtain thereof may be capable of use in a free or unbiased condition. Under other circumstances, however, it may be desirable to include one or more optional biasing devices, such as lengths of material 234 and/or 332, for example, such as to reduce deflections or movements of the protective curtain and thereby minimize impacts, contact and/or abrasion of one or more of the components of the operational portion of the suspension system. In still other situations, it may be desirable to include, either additionally or in the alternative, additional structural components suitable for more robustly maintaining separation between components of the protective portion and components of the operational portion.

Figure 7:
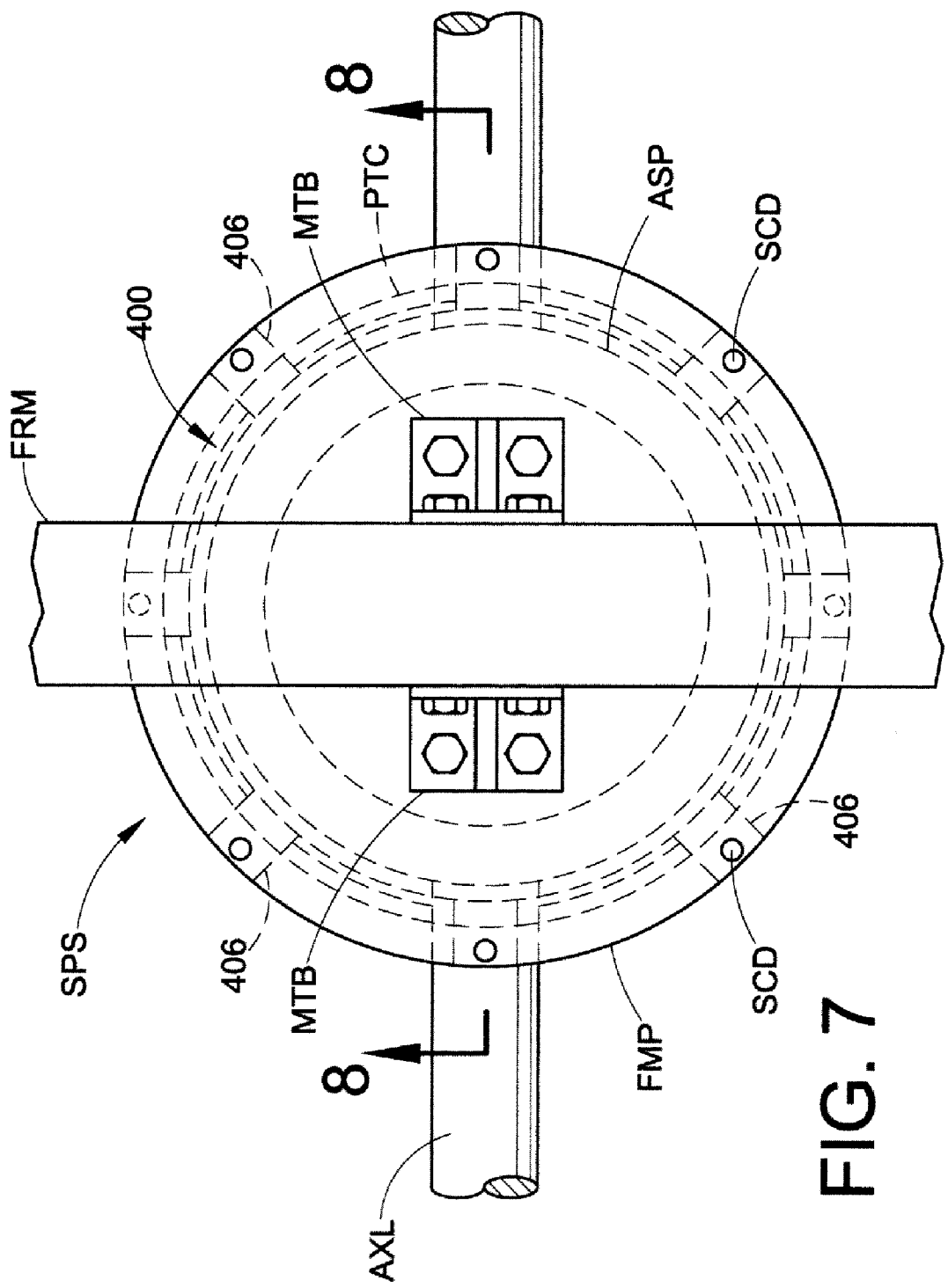
FIG. 7 is a top plan view of one exemplary embodiment of a structural backing arrangement shown in use in association with a protective curtain on an associated vehicle suspension system.
Figure 8:
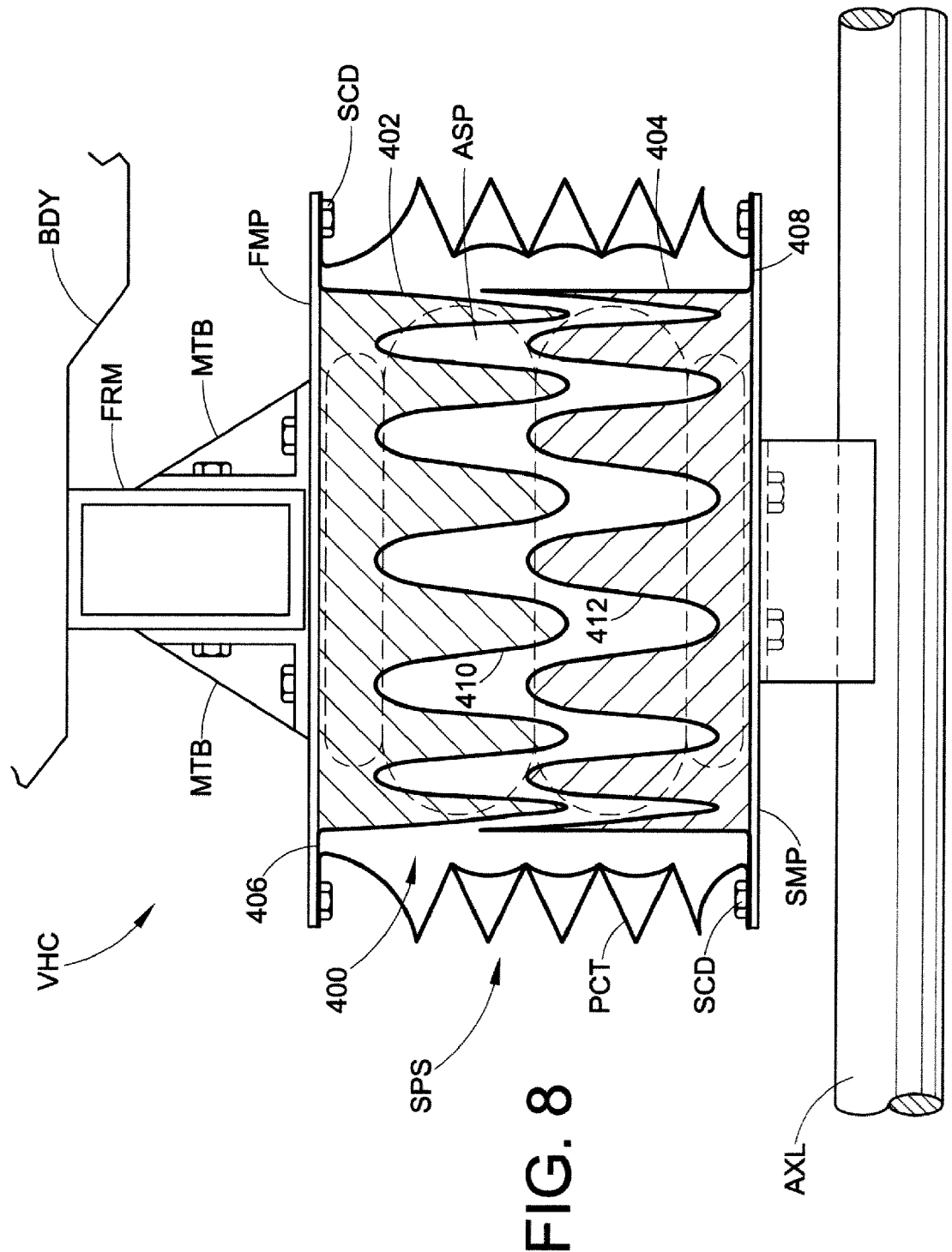
FIG. 8 is a side view of the structural backing arrangement, protective curtain and associated vehicle suspension system in FIG. 7.

One example of such a structural separating arrangement 400 is shown in FIGS. 7 and 8 as including a first or upper backing structure 402 and a second or lower backing structure 404. It will be recognized that structural backing arrangement 400 is shown in use in FIGS. 7 and 8 on a vehicle VHC having a sprung mass, such as a body BDY, frame member FRM and optional mounting brackets MTB, for example, an unsprung mass, such as a wheel WHL and/or an axle AXL, for example, and a suspension system SPS operatively disposed therebetween. Though any suitable suspension system could be used, suspension system SPS is shown as being substantially similar to suspension system 200 shown in FIGS. 3 and 4.

In the embodiment shown, the backing structures are supported in spaced relation to one another with first backing structure 402 supported along the sprung mass (e.g., body BDY, frame member FRM and/or mounting brackets MTB) and second backing structure 404 supported along the unsprung mass (e.g., wheel WHL or axle AXL). While it will be appreciated that the backing structures can be supported or otherwise secured on the vehicle suspension system in any suitable manner, in the exemplary embodiment shown, first backing structure 402 is supported on a first mounting plate FMP and second backing structure 404 is supported on a second mounting plate SMP. Backing structures 402 and 404 can be secured on the mounting plates or other suitable structures in any appropriate manner. In the exemplary embodiment shown in FIGS. 7 and 8, each of backing structures 402 and 404 includes a plurality of tabs 406 and 408, respectively, that extend between the associated mounting plate and the protective curtain PTC, and can be engaged by suitable securement devices SCD to secure the backing structure on or along the sprung, the unsprung mass or any suitable components operatively connected therebetween.

Furthermore, it will be appreciated that the structural backing arrangement can take any suitable form, configuration and/or arrangement, and can include any suitable number of components and/or elements. For example, backing structures 402 and 404 of structural backing arrangement 400 are each shown as being unitary components that extend fully around air spring assembly ASP of suspension system SPS. Additionally, backing structures 402 and 404 are shown as including complimentary edges 410 and 412, respectively. As an alternative, one backing structure could be spaced radially inwardly or outwardly from the other backing structure to provide clearance for the two backing structures to pass one another during a collapsed or compressed condition or movement of the air spring assembly and/or suspension system. As another alternative, individual backing elements could be used and mounted in spaced and/or staggered relation to one another on opposing support structures, such as mounting plates FMP and SMP, for example. Further still, a structural backing arrangement and/or components thereof can be formed from any suitably rigid and/or impact resistant material, such as metal or plastic, for example.

A protective portion in accordance with the present novel concept, including but not limited to protective portions 104, 204 and 304, can be formed from any suitable materials or combination of materials. For example, the first and second mounting plates of protective portions 204 and 304 can be formed from a metal, such as steel, titanium or aluminum, for example, a polymeric material, such as a high performance plastics, for example, or a suitable composite material.

As another example, protective curtains 144, 218 and 318 can be formed from any material or combination of materials suitable for at least partially shielding or otherwise protecting operational components of the suspension system, such as from road debris, high-velocity projectiles from firearms and weapons, and/or shrapnel from explosive devices. Suitable materials include metal mesh, reinforced fabric, reinforced thermoplastic rubber and reinforced vulcanized rubber. Any suitable reinforcing material can be used, such as filaments formed from glass fibers, aramid fibers and/or carbon fibers, for example, and can be formed, worked or otherwise integrated into the base material or materials in any suitable manner. In one exemplary embodiment, the protective curtain is formed from one of reinforced fabric, reinforced thermoplastic and reinforced vulcanized rubber with the reinforcing material including reinforcing filaments having an ultimate tensile strength of at least 10,000 psi and/or a modulus of elasticity of at least 200,000 psi. As one example, such a suitable reinforcing material could at least partially include nylon 6/6.

Additionally, the securement devices shown and described herein are generally indicated as being threaded fasteners, such as fasteners 150, 154, 156, 214, 216, 230, 314, 316, 328 and 334, for example. However, it will be appreciated that securement devices of any suitable type, kind or configuration, either removable or not removable, can alternately be used. For example, rivets, wire or zip ties or clips could alternately be used.

While the subject novel concept has been described with reference to the foregoing embodiments and considerable emphasis has been placed herein on the structures and structural interrelationships between the component parts of the embodiments disclosed, it will be appreciated that other embodiments can be made and that many changes can be made in the embodiments illustrated and described without departing from the principles of the subject novel concept. Obviously, modifications and alterations will occur to others upon reading and understanding the preceding detailed description. Accordingly, it is to be distinctly understood that the foregoing descriptive matter is to be interpreted merely as illustrative of the present novel concept and not as a limitation. As such, it is intended that the subject novel concept be construed as including all such modifications and alterations insofar as they come within the scope of the appended claims and any equivalents thereof.

The invention claims is:

1. A protective curtain assembly for an associated fluid suspension system of an associated vehicle having a sprung mass, an unsprung mass and a suspension member operatively connected therebetween, the associated fluid suspension system operatively disposed between the sprung mass and the suspension member and including a fluid spring assembly, said protective curtain assembly comprising:

a section of curtain material having a first curtain portion and a second curtain portion, said section of curtain material disposed in outwardly-spaced relation around at least a portion of the associated fluid spring assembly such that said first curtain portion is disposed along one side of the suspension member and said second curtain portion is disposed along an opposing side of the suspension member;

a first plurality of securement devices securing said first curtain portion of said section of curtain material along one side of the suspension member; and, a second plurality of securement devices securing said second curtain portion of said section of curtain material along an opposing side of the suspension member;

said section of curtain material being removably secured along the suspension member by said first and second pluralities of securement devices such that said section of curtain material can be removed and replaced while the fluid spring assembly remains operatively connected between the sprung mass and the suspension member.

2. A protective curtain assembly according to claim 1, wherein said section of curtain material includes one of metal mesh, reinforced thermoplastic elastomer, reinforced rubber and reinforced fabric.

3. A protective curtain assembly according to claim 2, wherein said one of said reinforced thermoplastic elastomer, reinforced rubber and reinforced fabric includes a plurality of reinforcing filaments having an ultimate tensile strength of at least 10,000 psi.

4. A protective curtain assembly according to claim 2, wherein said one of said reinforced thermoplastic elastomer, reinforced rubber and reinforced fabric includes a plurality of reinforcing filaments having an modulus of elasticity of at least 200,000 psi.

5. A protective curtain assembly according to claim 2, wherein said one of said reinforced thermoplastic elastomer, reinforced rubber and reinforced fabric includes a plurality of reinforcing filaments that include at least one of carbon fibers, aramid fibers or glass fibers.

6. A suspension system for an associated vehicle that includes a sprung mass and an unsprung mass, said suspension system comprising:

an operational portion supported between the sprung and unsprung masses, said operational portion including a fluid spring assembly, a damper assembly and a first suspension member, said fluid spring assembly and said damper assembly being disposed in spaced relation to one another and operatively connected between the sprung mass and said first suspension member; and, a protective portion including a curtain and a securement feature, said curtain disposed in outwardly-spaced relation to said fluid spring assembly and said damper assembly, and at least a portion of said curtain being removably secured along said first suspension member using at least said securement feature such that said curtain can be removed and replaced while said fluid spring assembly and said damper assembly remain operatively connected between the sprung mass and said first suspension member.

7. A suspension system according to claim 6, wherein said operational portion includes a second suspension member disposed in spaced relation to said first suspension member, and at least a second portion of said curtain is disposed along said second suspension member.

8. A suspension system according to claim 7, wherein said securement feature of said protective portion includes first and second securement devices, said first securement device removably securing said curtain along said first suspension member, and said second securement device removably securing said curtain along said second suspension member.

9. A suspension system according to claim 8, wherein said first securement device is one of a plurality of first securement devices threadably engaging said first suspension member, and said second securement device is one of a plurality of second securement devices threadably engaging said second suspension member.

10. A suspension system according to claim 6, wherein said fluid spring assembly includes a first end member, a second end member disposed in spaced relation to said first end member and a spring wall disposed therebetween, said spring wall having an outer periphery, and said curtain extending about at least 50 percent of said outer periphery of said spring wall.

11. A vehicle suspension system for use on an associated vehicle having a sprung mass and an unsprung mass, said vehicle suspension system comprising:

first and second suspension members disposed in spaced relation to one another and operatively connected between the sprung and unsprung masses;

an air spring assembly operatively disposed between the sprung mass and said first suspension member, said air spring assembly including a first end member operatively connected along the sprung mass, a second end member disposed in longitudinally spaced relation to said first end member, and a flexible wall secured between said first and second end members said air spring assembly displaceable in an approximately longitudinal direction between a compressed length and an extended length; and, a sheet of reinforced material extending along and removably secured to a least a portion of each of said first and second suspension members such that said sheet of reinforced material is said disposed in outwardly-spaced relation to said air spring assembly such that said sheet can be removed and replaced while said air spring assembly remains operatively connected between the sprung mass and said first suspension member.

12. A vehicle suspension system according to claim 11, wherein said sheet of reinforced material includes a plurality of reinforcing filaments including at least one of carbon fibers, aramid fibers or glass fibers.

13. A vehicle suspension system according to claim 11, wherein said sheet of reinforced material includes one of metal mesh, reinforced thermoplastic elastomer, reinforced rubber or reinforced fabric.

14. A protective curtain assembly according to claim 1, wherein the suspension member of the associated vehicle is a first suspension member and the associated vehicle includes a second suspension member disposed in spaced-relation to the first suspension member, and said first and second pluralities of securement devices also secure said section of curtain material along the second suspension member.

15. A vehicle suspension system according to claim 11 further comprising a damper assembly operatively connected between the sprung mass and said first suspension member adjacent said air spring assembly such that said sheet of reinforced material is disposed in outwardly-spaced relation to said damper assembly and said air spring assembly.

16. A vehicle suspension system according to claim 11 further comprising a plurality of threaded fasteners removably securing said sheet of reinforced material to said first and second suspension members.

17. A vehicle suspension system according to claim 11, wherein at least one of said first and second suspension members includes laterally-spaced support arms extending on opposing sides of said air spring assembly, and said sheet of reinforced material is secured along each of said support arms.

* * * * *